(12) United States Patent
Yang et al.

(10) Patent No.: US 7,406,139 B2
(45) Date of Patent: Jul. 29, 2008

(54) SYSTEM AND METHOD TO IDENTIFY A MODULATION FORMAT OF A DATA FRAME WITHIN A CELLULAR WIRELESS NETWORK

(75) Inventors: Baoguo Yang, Iselin, NJ (US); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/786,258

(22) Filed: Feb. 25, 2004

(65) Prior Publication Data

US 2004/0252790 A1 Dec. 16, 2004

Related U.S. Application Data

(60) Provisional application No. 60/478,922, filed on Jun. 16, 2003.

(51) Int. Cl.
*H03D 1/00* (2006.01)
*H04L 27/06* (2006.01)

(52) U.S. Cl. .................. 375/340; 375/316; 375/324; 375/327

(58) Field of Classification Search .............. 375/327
See application file for complete search history.

(56) References Cited

U.S. PATENT DOCUMENTS

| 6,400,928 | B1 * | 6/2002 | Khullar et al. ........... 455/67.11 |
| 6,456,598 | B1 | 9/2002 | Le Strat |
| 6,463,107 | B1 * | 10/2002 | Lindoff et al. .............. 375/343 |
| 6,539,205 | B1 | 3/2003 | Wan |
| 2002/0186761 | A1 | 12/2002 | Corbaton |
| 2004/0096012 | A1 * | 5/2004 | Yang ......................... 375/308 |
| 2004/0156448 | A1 * | 8/2004 | Sahlin et al. ............... 375/316 |

FOREIGN PATENT DOCUMENTS

| EP | 0 671 817 A | 9/1995 |
| EP | 1 033 852 A1 | 2/1999 |
| EP | 1 176 750 A | 1/2002 |

(Continued)

OTHER PUBLICATIONS

Ariyavisitakul S. L., et al; "A Broadband Wireless Packet Technique Based on Coding, Diversity and Equalization"; Universal Personal Communications 1998: (p. 363-367).

*Primary Examiner*—Curtis B Odom
(74) *Attorney, Agent, or Firm*—Garlick Harrison & Markison; Kevin L. Smith

(57) ABSTRACT

The modulation format of a data block (frame) received from a servicing base station by a wireless terminal in a cellular wireless communication system is identified. This involves first receiving several radio frequency (RF) bursts of one data block (frame) from the servicing base station. The RF burst carries a number of modulated symbols. The training sequence is extracted from the RF burst and is made of a number of modulated symbols. The training sequences are first processed assuming a first modulation format to produce a first accumulated channel energy. Then, the training sequences are processed assuming a second modulation format to produce a second accumulated channel energy. The first and second accumulated channel energies are compared to determine which accumulated channel energy is greater. The modulation format of the data block is identified as the modulation format corresponding to the greater accumulated channel energy.

5 Claims, 11 Drawing Sheets

FOREIGN PATENT DOCUMENTS

| | | |
|---|---|---|
| GB | 2 341 296 A | 3/2000 |
| WO | WO 00/69023 | 11/2000 |
| WO | WO 01/33792 A1 | 5/2001 |
| WO | WO 02/071608 A1 | 9/2002 |
| WO | WO 03/032593 A1 * | 4/2003 |

* cited by examiner

US 7,406,139 B2

SYSTEM AND METHOD TO IDENTIFY A MODULATION FORMAT OF A DATA FRAME WITHIN A CELLULAR WIRELESS NETWORK

CROSS REFERENCES TO RELATED APPLICATIONS

This application claims priority to U.S. Provisional Patent Application Ser. No. 60/478,922, filed Jun. 16, 2003, which is incorporated herein by reference for all purposes.

BACKGROUND

1. Technical Field

The present invention relates generally to cellular wireless communication systems, and more particularly to the receipt of data by a wireless terminal within a cellular wireless communication system.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 20 ms frame that is divided into four sub-frames, each including eight slots of approximately 625 µs in duration. Each slot corresponds to a Radio Frequency (RF) burst having a left side, a midamble, and a right side. The midamble typically contain a training sequence whose exact configuration depends on modulation format used. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless terminals must be able to identify the modulation format of any RF burst for successful demodulation and receipt of the RF burst.

While the training sequence assists in processing the RF burst, properly selecting the modulation format, particularly in an environment where the modulation format may vary is problematic. The wireless terminal needs to immediately identify the modulation format in order to properly receive the RF burst and extract data carried therein. Thus, a need exists for a means to quickly and efficiently identify the modulation format for the wireless terminal without the wireless terminal performing unnecessary data processing.

BRIEF SUMMARY OF THE INVENTION

In order to overcome the shortcomings of prior devices, the present invention provides a system and method to identify the modulation format of the data frame received from a servicing base station by a wireless terminal in a cellular wireless communication system. Typically, each data block contains 4 radio frequency (RF) bursts, where each of the 4 RF bursts use the same modulation format. The RF burst contains a number of modulated symbols that make up the data portion and the training sequence. When the first RF burst of the block is received, the training sequence is extracted from the burst. Each symbol of the received training sequence is de-rotated with the rotation frequency of a first modulation format such as GMSK. The channel impulse response (CIR) is estimated based on the de-rotated training sequence. A first channel energy is generated using the estimated CIR assuming the GMSK modulation format. Then, the process is repeated to produce a second channel energy that assumes a second modulation format such as 8PSK. Here the received training sequence is de-rotated using the 8PSK rotation frequency. The CIR is estimated based on the de-rotated training sequence. A second channel energy is then generated assuming the 8PSK modulation format. The first channel energy and second channel energy are compared to determine which channel energy is greater. The modulation format of the RF burst is identified as the modulation format that corresponds to the greater channel energy. The identified modulation format of the RF burst may then be used for subsequent RF bursts within the same data block.

In this first embodiment, processing the training sequence involves utilizing both the first modulation format and second modulation format. These modulation formats may further involve de-rotating individual modulated symbols within the training sequence. The first modulation format, for example, may be GMSK, while the second modulation format may be 8PSK. However, other modulation formats known to those skilled in the art may be employed.

Additionally, the first and second channel energies may be accumulated and compared over multiple RF burst to provide a more accurate determination of the modulation format. To achieve this improve the probability of correctly detecting the modulation format, multiple RF bursts, such as the first 2 or 3 received RF bursts within the data block are used to perform the blind modulation format detection. For subsequent RF bursts, the first and second channel energies, which may assume GMSK or 8PSK respectively, are produced in the same way as was done with the first RF burst. The channel energies are then accumulated with those from previous RF bursts results that assumed the same modulation format. The modulation format of the RF burst is identified as the modulation format corresponding to that of the greater accumulated channel energy. If the previously detected modulation format differs from the currently detected modulation format, the detected soft bits of previous RF bursts may be discarded or replaced with dummy bits. Another embodiment stores the previous RF bursts and reprocesses the RF bursts with the currently detected modulation format when modulation format detection error happens. One embodiment of the present invention performs blind modulation format detection on only the first three RF bursts. The fourth or final RF burst of the data block may use the detection result of the third or next-to-last RF burst.

Another embodiment provides another method to identify the modulation format in the data frame. After the first burst of the block is received, the training sequence is extracted. The training sequence is first de-rotated assuming a first modulation format such as the GMSK rotation frequency, and the channel estimate is produced based on the de-rotated training sequence. The channel estimate is then applied to the GMSK reference training sequence to produce the reconstructed training sequence. The reconstructed training sequence is compared with de-rotated training sequence to generate the first error magnitude result that assumes the first modulation format (GMSK). Then, the received training sequence is once more de-rotated assuming a second modulation format, such as the 8PSK rotation frequency, and the channel estimate is produced based on the de-rotated training sequence. The channel estimate is then applied to the 8PSK reference training sequence to produce the reconstructed training sequence. The reconstructed training sequence is compared with de-rotated training sequence to generate a second error magnitude result with the 8PSK assumption. The modulation format of the burst is identified as that modulation format corresponding to the smaller error magnitude. The identified modulation format from the first RF burst can be used to process subsequent RF bursts. To improve the probability of correctly detecting, the error magnitude may be accumulated over multiple RF bursts. For example, the error magnitude may be accumulated over the first 2 or 3 RF bursts. For subsequent RF bursts, the first error magnitude and second error magnitude that assume GMSK or 8PSK respectively are produced in the same way as those of the first RF burst. The error magnitudes are accumulated with those of previous RF bursts that assumed the same modulation format. The modulation format of the RF burst is identified as the modulation format corresponding to the smaller accumulated error magnitude. If the previously detected modulation format differs from the current modulation format, the detected soft bits of previous bursts may be discarded or simply replaced with dummy soft bits. Another choice stores the previous RF burst data, which may be reprocessed assuming the current modulation format when modulation format detection errors occur. One embodiment of the present invention performs blind modulation format detection on only the first three RF bursts. The fourth or final RF burst of the data block may use the detection result of the third or next-to-last RF burst.

Yet another embodiment provides a wireless terminal that operates within a cellular wireless network. This wireless terminal has an RF front end, a baseband processor communicatively coupled to the RF front end, and an optional encoder/decoder (CODEC) processing module, which if present is communicatively coupled to the baseband processor. The combination of the RF front end, baseband processor, and CODEC processing module (if present) receives the RF bursts and extracts training sequences from the RF bursts. As in the previous embodiments, the training sequences may be processed assuming a first modulation format to produce a first accumulated channel energy. Next, the combination processes the training sequences assuming the second modulation format to produce a second accumulated channel energy. The combination identifies the modulation format of the RF bursts as the modulation format corresponding to the greater of the first and second accumulated channel energies.

In yet another embodiment, the combination of RF front end, baseband processor, and CODEC (if present) extract the training sequences from the RF bursts to produce the channel estimate assuming a first modulation format. The combination applies the channel estimate to the referenced training sequence of the first modulation format to produce the reconstructed training sequences. They are compared with received training sequences to produce the accumulated error magnitude with the first modulation format assumption. Next, the combination produces the channel estimate assuming a second modulation format. The channel estimate is then applied to the referenced training sequence of the second modulation format to produce the reconstructed training sequences. They are compared with received training sequences to produce the accumulated error magnitude with the second modulation format assumption. The modulation format of the bursts of the block is then identified as the modulation format corresponding to the smaller accumulated error magnitude.

Other features and advantages of the present invention will become apparent from the following detailed description of the invention made with reference to the accompanying drawings.

DETAILED DESCRIPTION OF THE DRAWINGS

Figure 1:
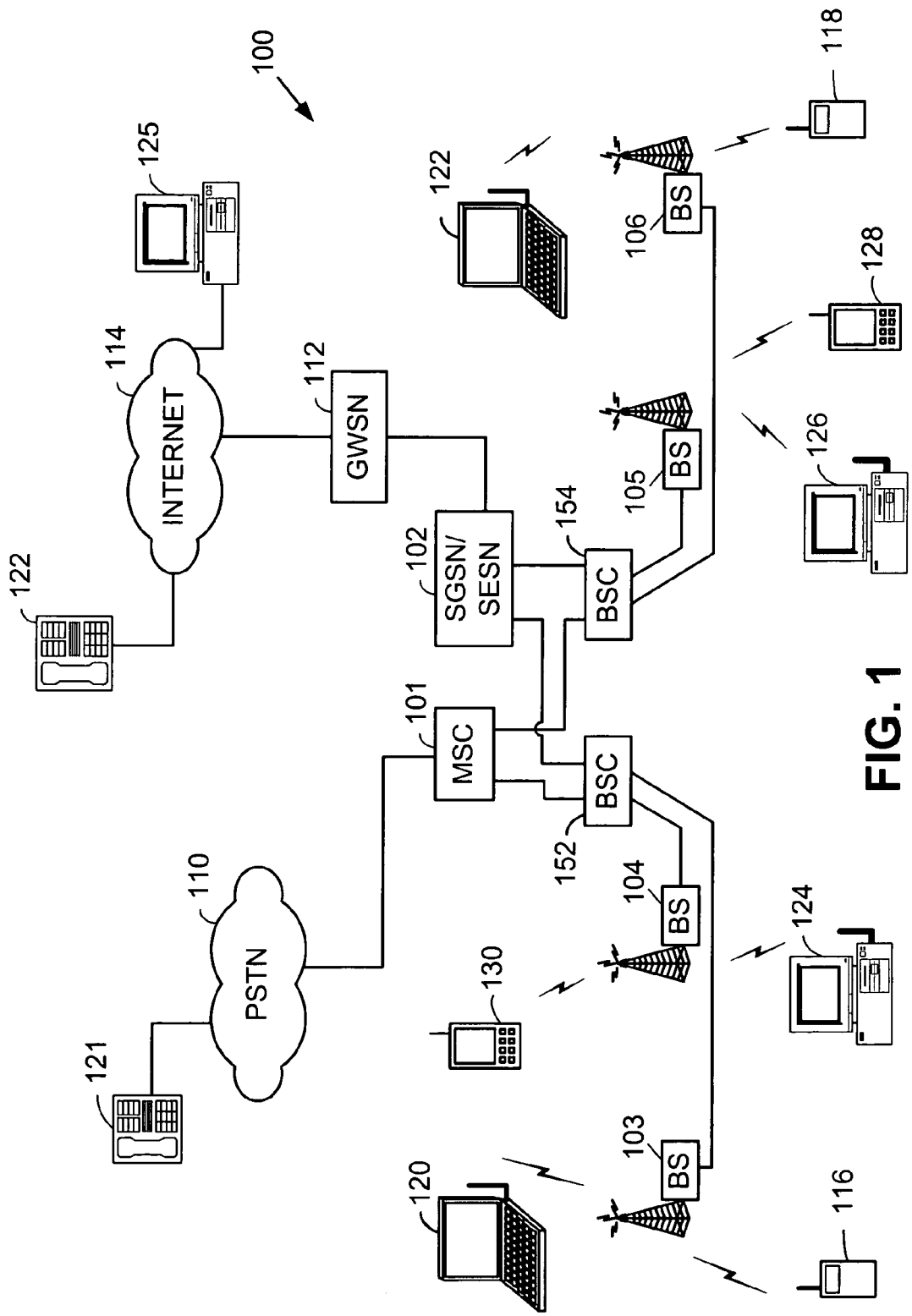
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the GPRS and/or EDGE operating standard as well as supporting the voice servicing portions the GSM standard.

In particular, the wireless terminals 116-130 support the pipelined processing of received RF bursts in slots of a GSM frame so that a plurality of slots in each sub-frame of a GSM frame are allocated for forward link transmissions to a single wireless terminal. In one particular embodiment, a number of slots of a GSM frame are allocated for forward link transmissions to a wireless terminal such that the wireless terminal must receive and process a number of RF bursts, e.g., 2, 3, 4, or more RF bursts, in each sub-frame of the GSM frame. The wireless terminal is able to process the RF bursts contained in these slots and still service reverse link transmissions and the other processing requirements of the wireless terminal.

Figure 2:
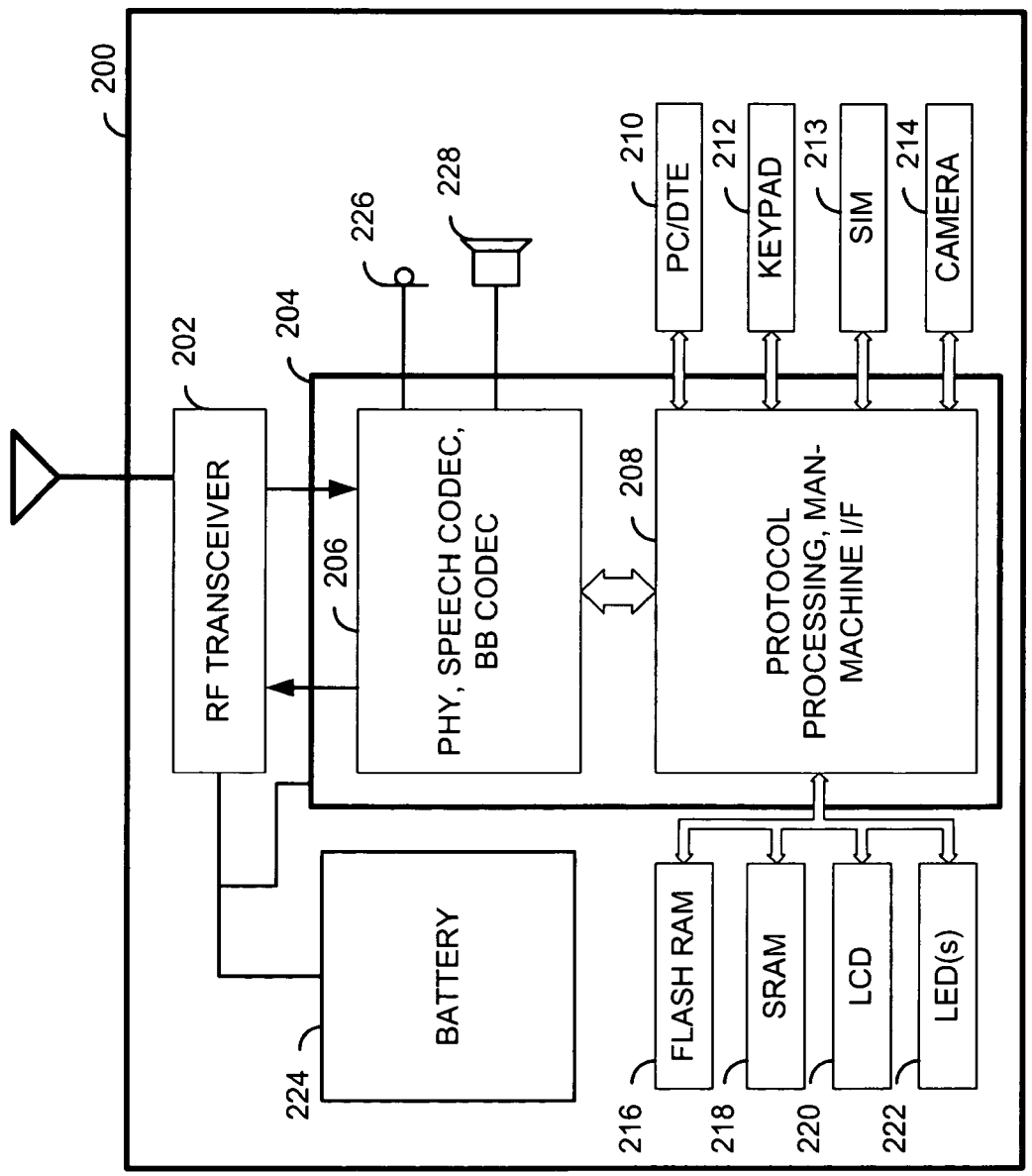
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DEcoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
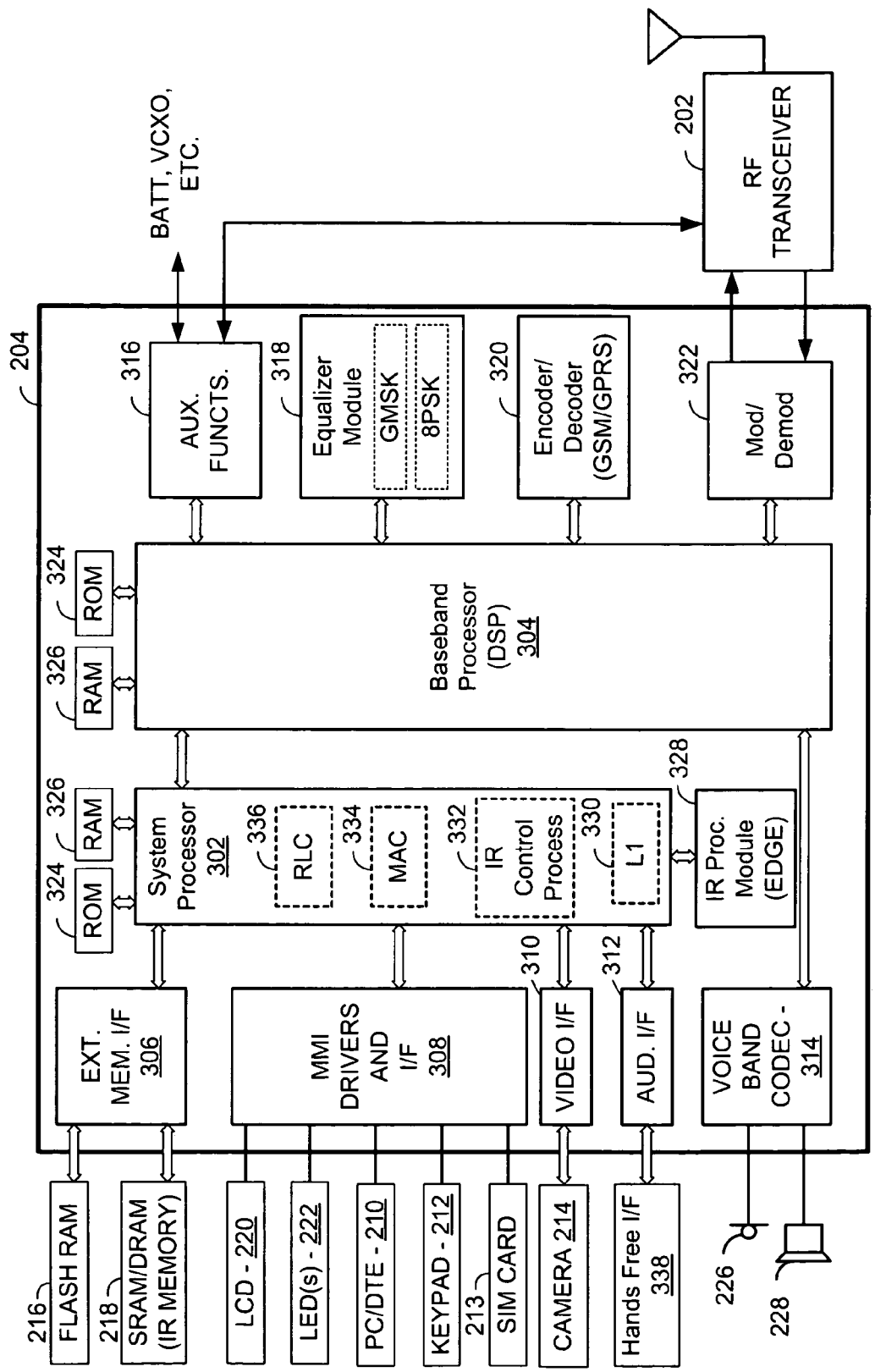
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process",), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further with reference to FIGS. 5-6B, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each sub-frame of a GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

Figure 4:
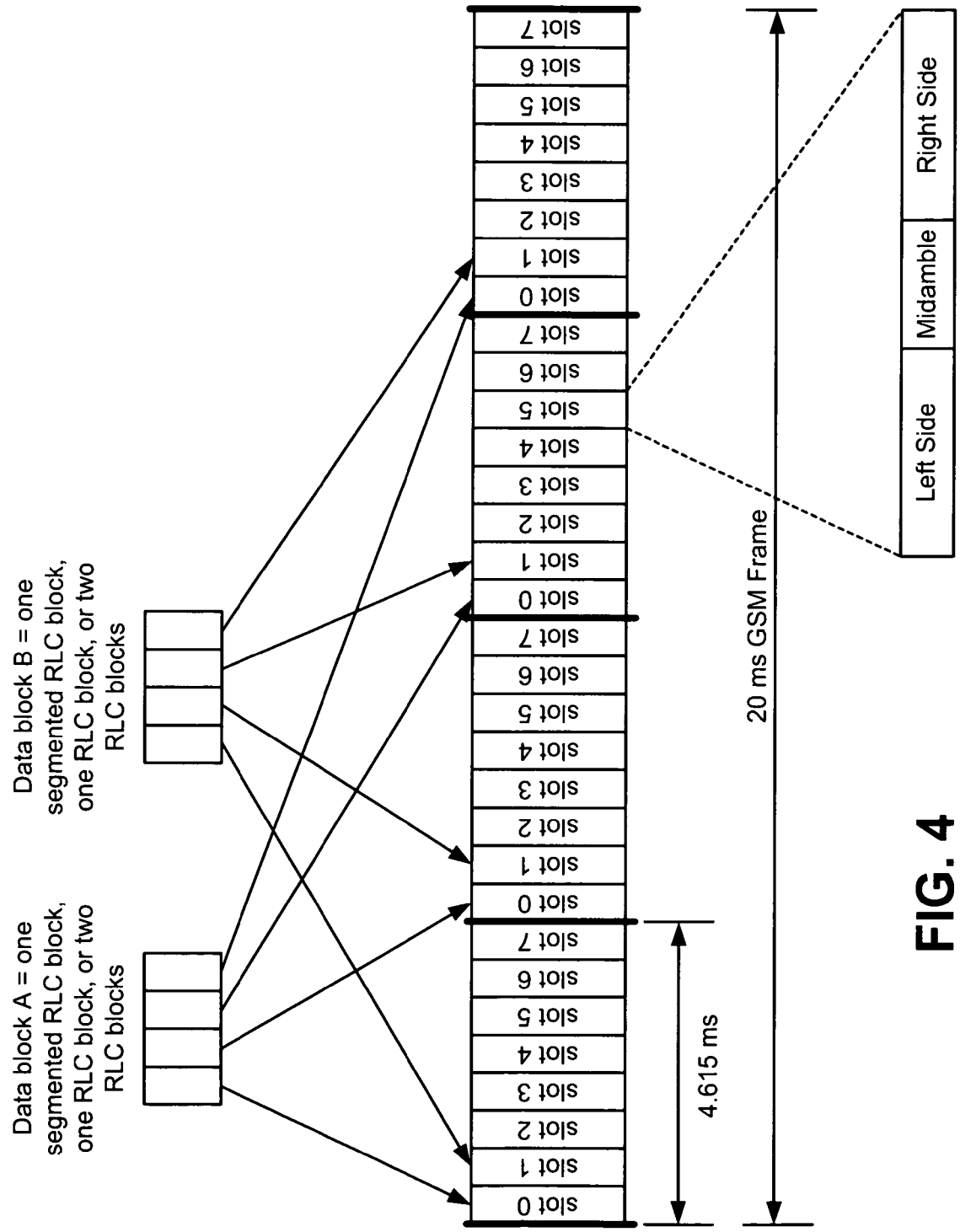
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, including guard periods, is divided into four sub-frames, and includes eight slots, slots 0 through 7, in each sub-frame. Each slot is approximately 577 µs in duration, includes a left side, a midamble, and a right side. The left side and right side of an RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode or GPRS CS-n mode, e.g., CS-1, CS-2. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode or CS mode of each set of slots, i.e., slot n of each sub-frame, for the GSM frame is consistent for the GSM frame. Further, the MCS mode or CS mode of differing sets of slots of the GSM frame, e.g., slot 0 of each sub-frame vs. any of slots 1-7 of each sub-frame, may differ. As will be described further with reference to FIG. 5, the wireless terminal 200 may be assigned multiple slots for forward link transmissions that must be received and processed by the wireless terminal 200.

Figure 5:
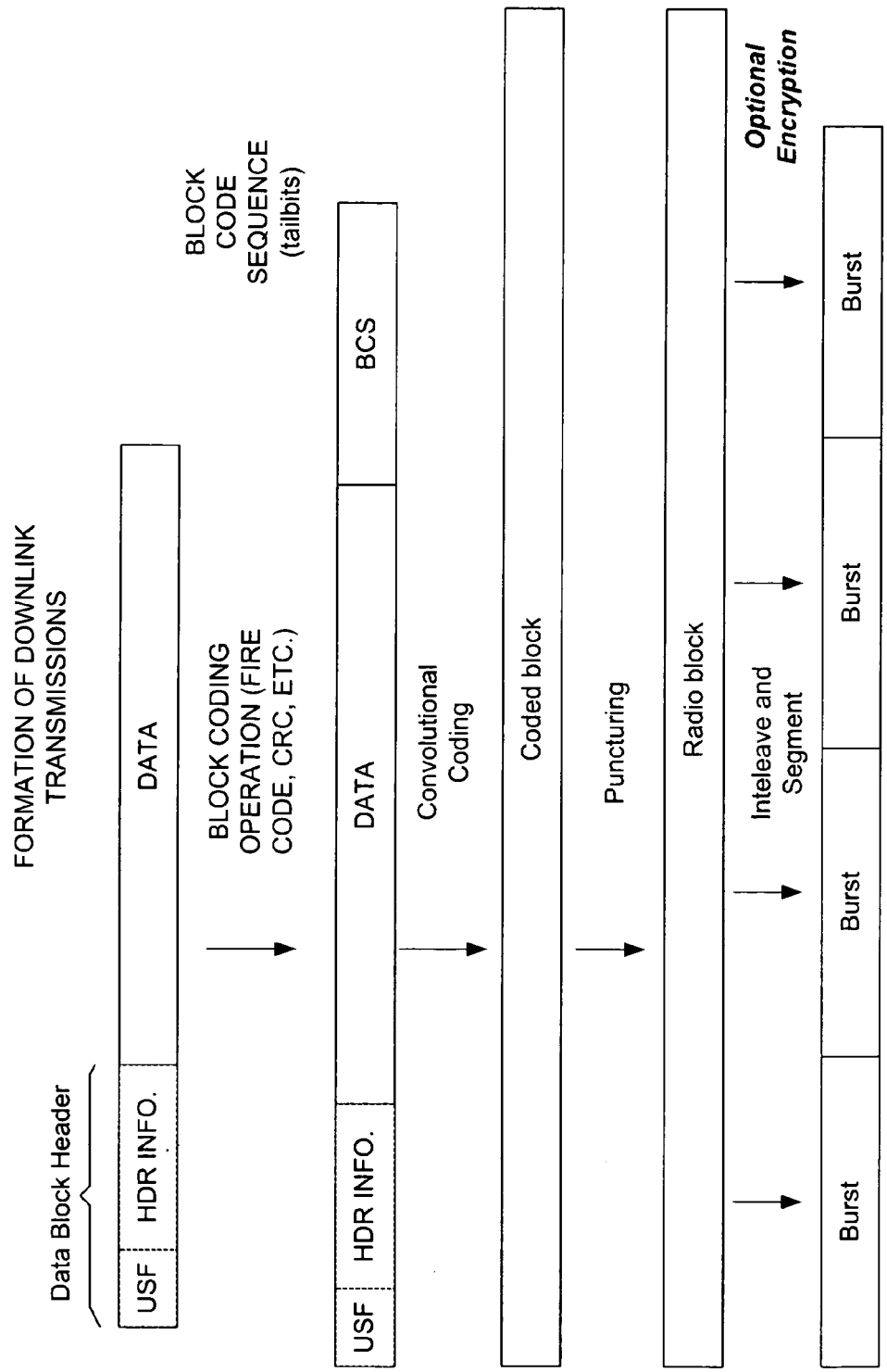
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some redundant bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format. Different methods of determining the modulation format from the training sequence will be described in FIGS. 6A through 10.

Figure 6A:
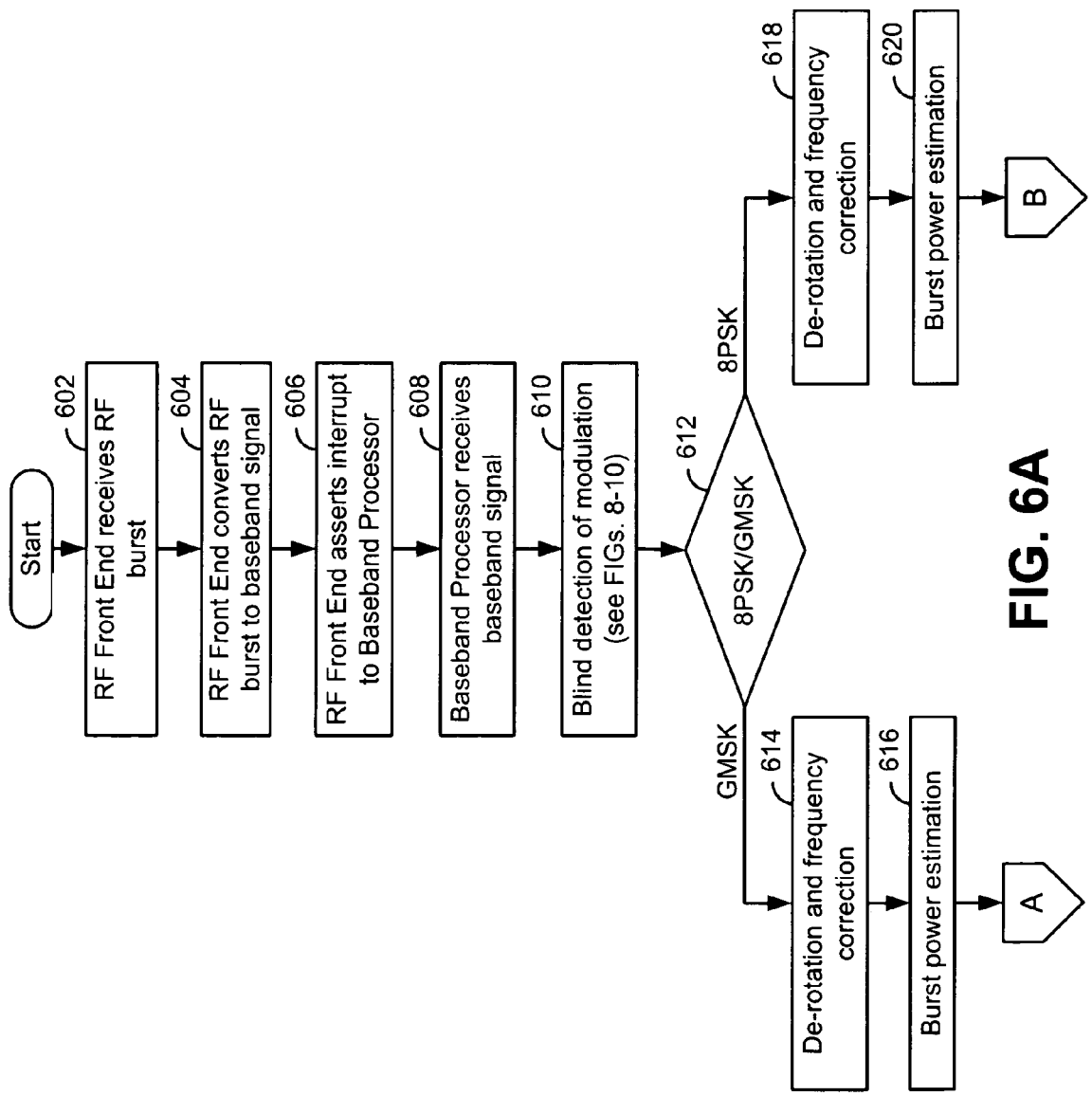
FIGS. 6A and 6B are flow charts illustrating operation of a wireless terminal in receiving and processing a RF burst.
Figure 6B:
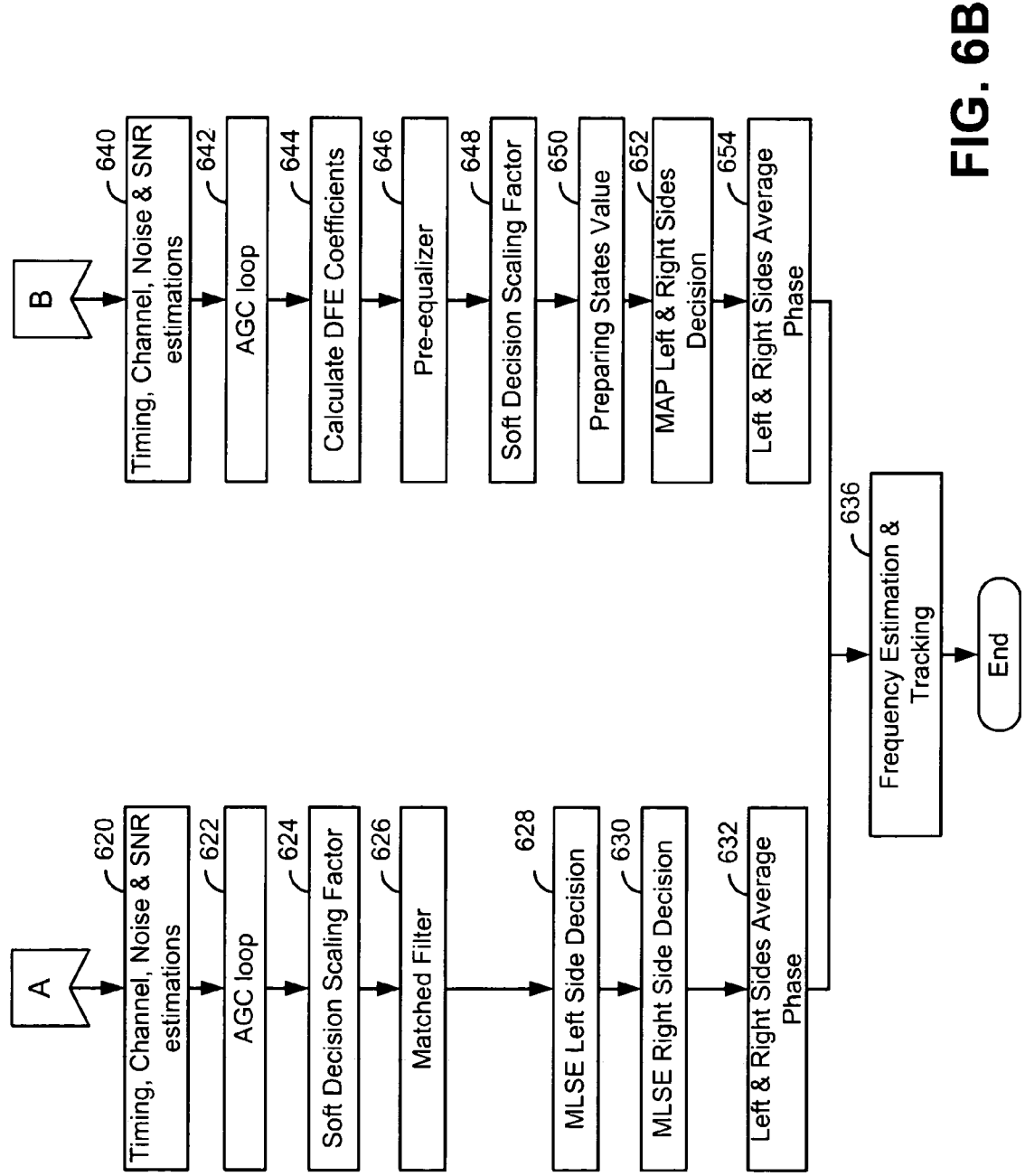

FIGS. 6A and 6B are flow charts illustrating operation of a wireless terminal 200 in receiving and processing a RF burst. The operations illustrated in FIG. 6A to 6B correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions illustrated in FIGS. 6-10.

Referring particularly to FIG. 6A, operation commences with the RF front end 202 receiving an RF burst in a corresponding slot of a GSM frame (step 602). The RF front end 202 then converts the RF burst to a baseband signal (step 604). Upon completion of the conversion, the RF front end 202 sends an interrupt to the baseband processor 304 (step 606). Thus, as referred to in FIG. 6A, the RF front end 202 performs steps 602-606.

Operation continues with the baseband processor 304 receiving the baseband signal (step 608). In a typical operation, either the RF front end 202, the baseband processor 304, or modulator/demodulator 322 will sample the analog baseband signal to digitize the baseband signal. After receipt of the baseband signal (in a digitized format), the baseband processor 304 performs blind detection of a modulation format of the baseband signal (step 610). This blind detection of the modulation format determines the modulation format of the corresponding baseband signal. The processes associated with step 610 are further detailed in FIGS. 8-10. In one particular embodiment according to the GSM standard, the modulation format will be either Gaussian Minimum Shift Keying (GMSK) modulation or Eight Phase Shift Keying (8PSK) modulation. The baseband processor 304 makes the determination (step 612) and proceeds along one of two branches based upon the detected modulation format.

For GMSK modulation, the baseband processor 304 performs de-rotation and frequency correction of the baseband signal (step 614). Next, the baseband processor 304 performs burst power estimation of the baseband signal (step 616). Referring now to FIG. 6B via off page connector A, the baseband processor 304 next performs timing, channel, noise, and signal-to-noise ratio (SNR) estimation (step 620). Subsequently, the baseband processor 304 performs automatic gain control (AGC) loop calculations (step 622). Next, the baseband processor 304 performs soft decision scaling factor determination on the baseband signal (step 624). After step 624, the baseband processor 304 performs matched filtering operations on the baseband signal (step 626).

Steps 608-626 are referred to hereinafter as pre-equalization processing operations. With the baseband processor 304 performing these pre-equalization processing operations on the baseband signal, baseband processor 304 produces a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation. The equalizer module 318 receives the processed baseband signal, settings, and/or parameters from the baseband processor 304 and performs Maximum Likelihood Sequence Estimation (MLSE) equalization on the left side of the baseband signal (step 628). As was shown previously with reference to FIG. 4, each RF burst contains a left side of data, a midamble, and a right side of data. The midamble includes predefined training sequence that may be based on the modulation format. At step 628, the equalizer module 318 equalizes the left side of the RF burst to produce soft decisions for the left side. Then, the equalizer module 318 equalizes the right side of the processed baseband signal (step 630). The equalization of the right side produces a plurality of soft decisions corresponding to the right side.

The equalizer module 318 then issues an interrupt to the baseband processor 304 indicating that the equalizer operations are complete for the RF burst. The baseband processor 304 then receives the soft decisions from the equalizer module 318. Next, the baseband processor 304 determines an average phase of the left and right sides based upon the soft decisions received from the equalizer module 318 (step 632). The baseband processor 304 then performs frequency estimation and tracking based upon the soft decisions received from the equalizer module 318 (step 636). The operations of step 632 (or step 654) and step 636 are referred to herein as "post-equalization processing." After operation at step 636, processing of the particular RF burst is completed.

Referring again to FIG. 6A, the baseband processor 304 and equalizer module 318 take the right branch from step 612 when an 8PSK modulation is blindly detected at step 610. In the first operation for 8PSK modulation, the baseband processor 304 performs de-rotation and frequency correction on the baseband signal (step 618). The baseband processor 304 then performs burst power estimation of the baseband signal (step 620). Referring now to FIG. 6B via off page connector B, operation continues with the baseband processor 304 performing timing, channel, noise, and SNR estimations (step 640). The baseband processor 304 then performs AGC loop calculations on the baseband signal (step 642). Next, the baseband processor 304 calculates Decision Feedback Equalizer (DFE) coefficients that will be used by the equalizer module 318 (step 644). The baseband processor 304 then performs pre-equalizer operations on the baseband signal (step 646). Finally, the baseband processor 304 determines soft decision scaling factors for the baseband signal (step 648). Steps 618-648 performed by the baseband processor 304 are referred to herein as "pre-equalization processing" operations for an 8PSK modulation baseband signal. Upon completion of step 648, the baseband processor 304 issues a command to equalizer module 318 to equalize the processed baseband signal.

Upon receipt of the command from the baseband processor 304, the equalizer module 318 receives the processed baseband signal, settings, and/or parameters from the baseband processor 304 and commences equalization of the processed baseband signal. The equalizer module 318 first prepares state values that it will use in equalizing the 8PSK modulated processed baseband signal (step 650). In the illustrated embodiment the equalizer module 318 uses a Maximum A posteriori Probability (MAP) equalizer. The equalizer module 318 then equalizes the left and right sides of the processed baseband signal using the MAP equalizer to produce soft decisions for the processed baseband signal (step 652). Upon completion of step 654, the equalizer module 318 issues an interrupt to the baseband processor 304 indicating its completion of equalizing the processed baseband signal corresponding.

The baseband processor 304 then receives the soft decisions from the equalizer module 318. Next, the baseband processor 304 determines the average phase of the left and right sides of the processed baseband signal based upon the soft decisions (step 654). Finally, the baseband processor 304 performs frequency estimation and tracking for the receiver. (Step 636). The operations of steps 654 and 636 are referred to as post-equalization processing operations. From step 636, operation is complete for the particular RF burst depicts the various stages associated with recovering a data block from an RF Burst.

While the operations of FIGS. 6A and 6B are indicated to be performed by particular components of the wireless terminal, such segmentation of operations could be performed by differing components. For example, the equalization operations could be performed by the baseband processor 304 or system processor 302 in other embodiments. Further, the baseband processor 304 or the system processor 302 in other embodiments could also perform decoding operations.

Figure 7:
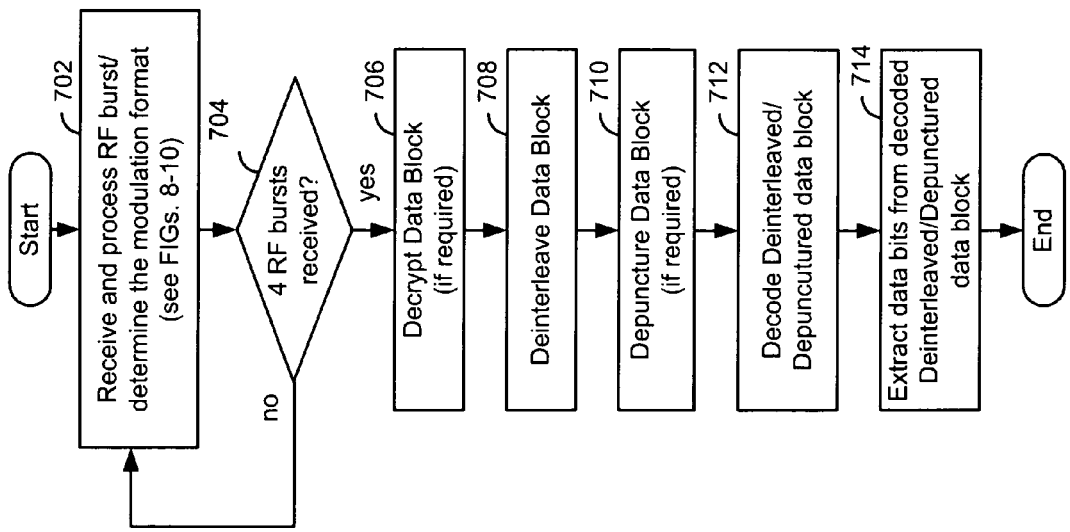
FIG. 7 is a flow chart illustrating operations to recover a data block according to an embodiment of the present invention.

FIG. 7 is a flow chart illustrating operations to decode a data block according to an embodiment of the present invention. Operations commence with receiving and processing an RF burst in step 702 and as described with reference to FIGS. 6A and 6B. This includes determining the modulation format in order to properly demodulate the RF burst(s) as described in FIGS. 8-10. After receiving the four RF bursts that complete an EDGE or GPRS data block, as determined at step 704, operation proceeds to step 706.

A header of the data block identifies the coding scheme and puncturing pattern of the data block. For example, the coding scheme may be any one of the CS-1 through CS-4 or MCS-1 through MCS-9 coding schemes, each of which may include multiple puncturing patterns. Operation according to the present invention uses the training sequence of each RF burst, located within the midamble of the RF burst, to identify the modulation format of the RF burst.

Data recovery begins in step 706 where, if necessary, the data block is decrypted. The data block is then de-interleaved (step 708) according to a particular format of the data block, e.g. MCS-1 through MCS-9 or CS-1 through CS-4. The data block is then de-punctured (step 710). At step 712, the de-interleaved and de-punctured data block is decoded. Decoding operations may include combining previously received copies of the data block with the current copy of the data block. Data bits of the decoded data block are then extracted and processed further (step 714).

Figure 8:
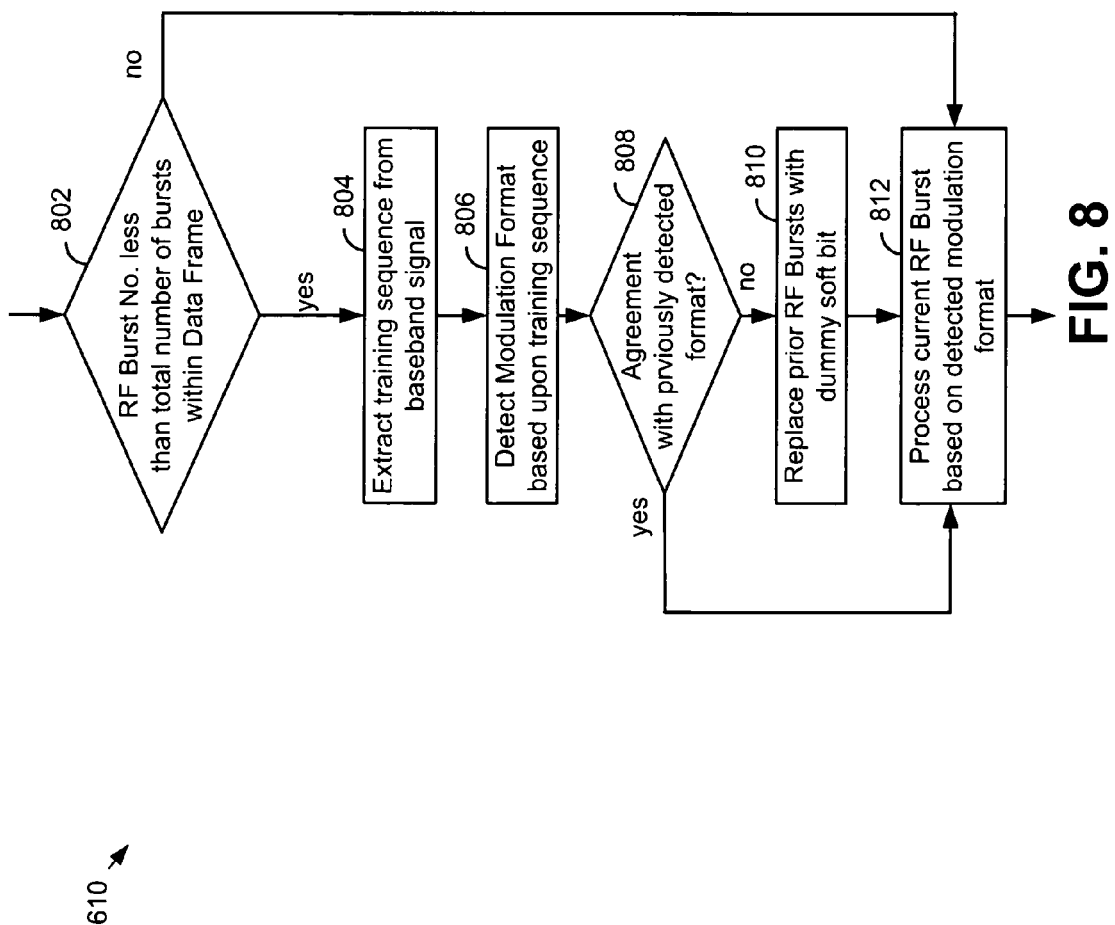
FIG. 8 is a flow chart illustrating operations to detect the modulation format of an RF burst according to an embodiment of the present invention.

FIG. 8 describes one embodiment used to determine a modulation format of a received RF burst (step 610 of FIG. 6A). First, at decision point 802 a determination is made as to which sequential RF Burst from within the data block has been presented for processing. Typically, the data block contains four RF bursts. The RF bursts are indexed as numbers 0, 1, 2; and 3. Only the first 3 RF bursts, 0, 1, and 2, are used in this embodiment to perform modulation format detection. If the RF burst is indexed as 0, 1, or 2, (less than 3 within the data block), the training sequence is extracted from the baseband signal in step 804. The modulation format is detected based upon the training sequence in step 806. Particular embodiments for performing step 806 are described further in FIGS. 9 and 10. When the RF burst is the first RF burst of a data block made up of multiple RF bursts the modulation format detected in step 806 is used to process the RF burst. However, if the RF burst is not the first RF burst of a corresponding data block, a determination is made at decision point 808 as to whether or not the detected modulation format agrees with the modulation format that was determined for one or more prior RF bursts. When agreement exists, the agreed modulation format is used to process the RF burst in step 812.

However, if agreement does not exist at decision point 808 between the current RF burst and prior RF burst(s), several options exist. As shown in step 810 the detected soft bits of prior RF Bursts may be discarded by replacing them with dummy soft bits. With the embodiment, the soft decisions of the prior burst are discarded when the subsequently determined modulation format differs from the previously determined modulation format. With this operation, any information contained in the prior RF bursts is lost and it is assumed that a coding scheme is robust enough that the data block can still be decoded correctly with remaining RF bursts. In another embodiment, the prior RF burst is reprocessed based on the newly selected modulation format. This reprocessing may be required for less robust coding schemes. Such reprocessing ensures all of the available information from the RF burst to be captured. Reprocessing would typically involve re-equalizing the samples of the RF burst.

Figure 9:
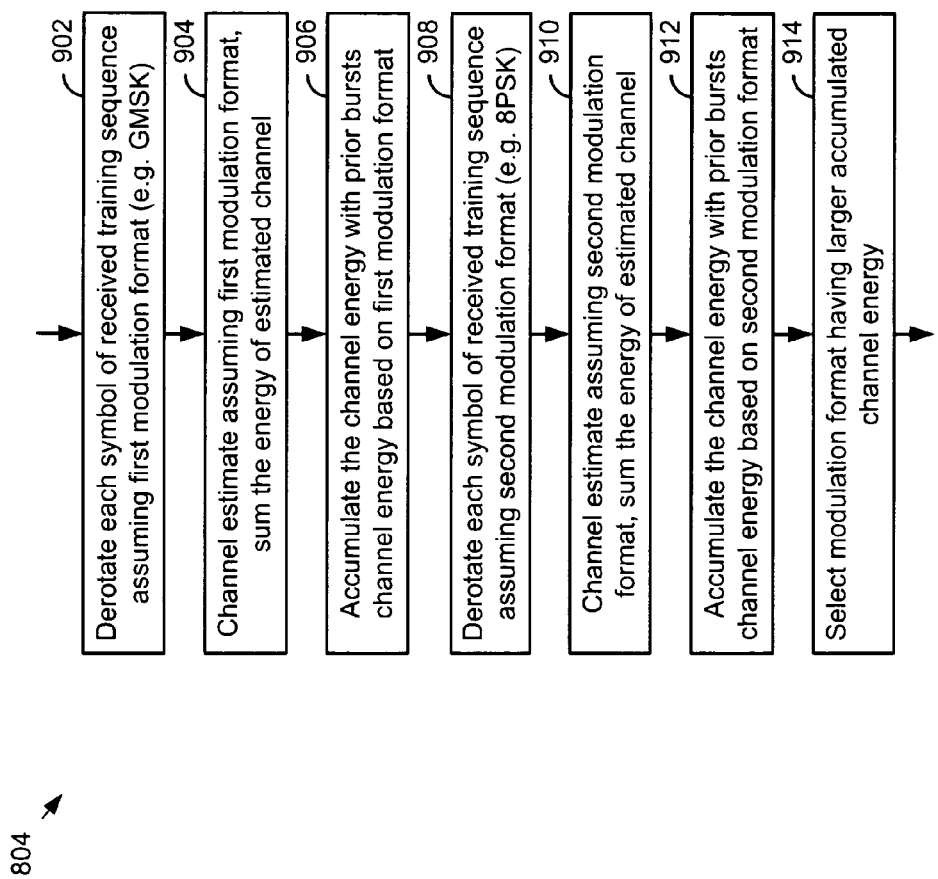
FIG. 9 is a flow chart illustrating operations in further detail that detect the modulation format of an RF burst according to an embodiment of the present invention.

FIG. 9 illustrates a first embodiment of step 804. In this embodiment, the training sequence is extracted from the RF burst. This involves de-rotating each symbol with the rotation frequency of the first modulation format, e.g., GMSK as shown in step 902. The CIR is estimated based on the de-rotated training sequence, and the channel energy is generated based on the estimated CIR assuming the first modulation format in step 904. The channel energy may be accumulated with the channel energies of prior bursts of the same data block with the first modulation format assumption to produce an accumulated channel energy in step 906. Next, the training sequence is processed assuming a second modulation format in steps 908, 910 and 912. This involves de-rotating each symbol of the training sequence with the rotation frequency of the second or alternative modulation format beginning with step 908. For example, 8PSK may be used in the second case. The CIR is estimated based on the de-rotated training sequence, and the channel energy is generated based on the estimated CIR assuming the second modulation format in step 904.The channel energy may be accumulated with the channel energies of prior bursts of the same data block with the second modulation format assumption to produce a second accumulated channel energy in step 912. In step 914, a determination as to which modulation format resulted in a greater channel energy or accumulated channel energy. The modulation format corresponding to the greater accumulated channel energy is then selected as the modulation format of the RF burst(s). At the first RF burst of the data block, the two channel energy accumulation registers are reset as 0.

Figure 10:
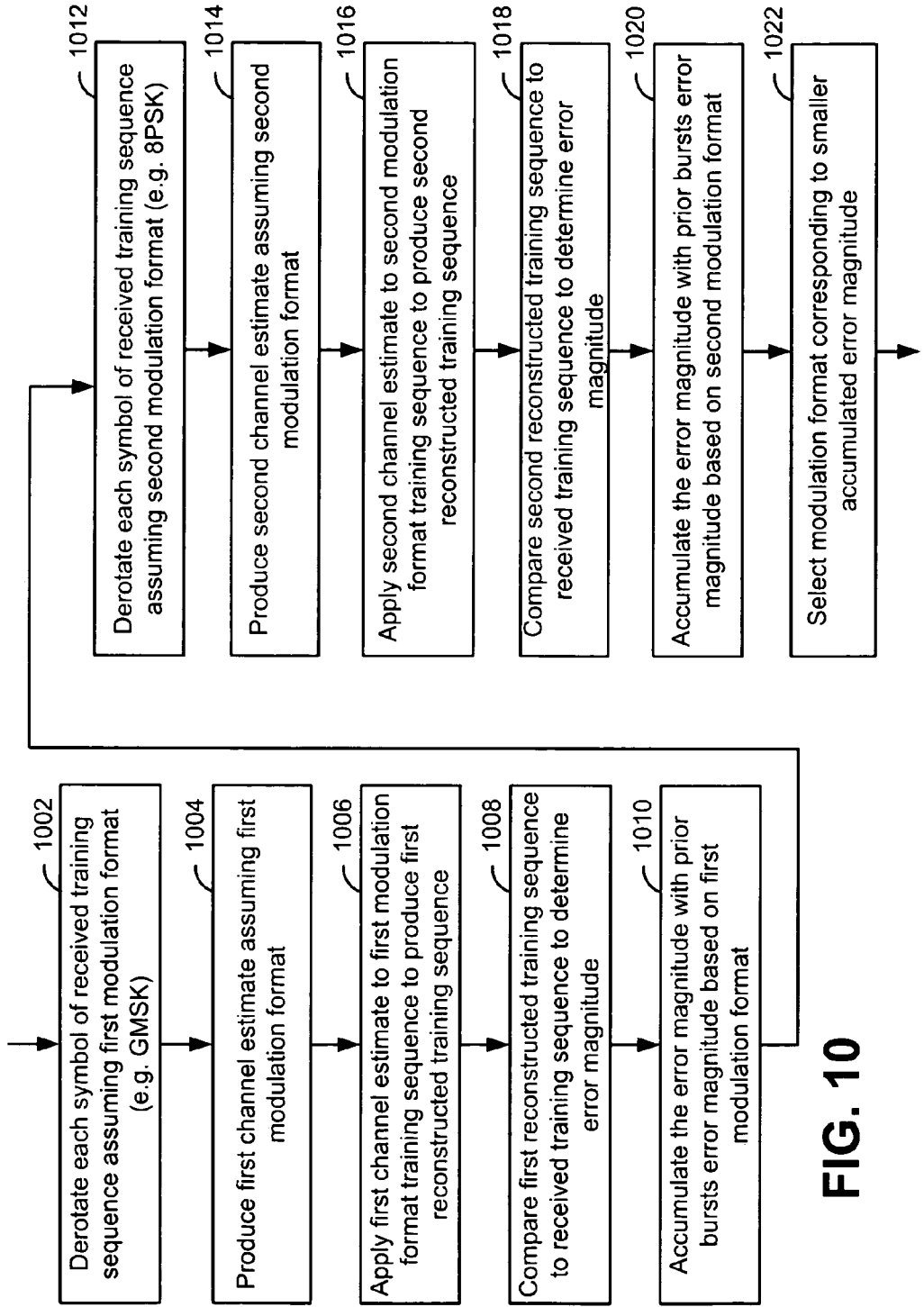
FIG. 10 is a flow chart illustrating operations in further detail that detect the modulation format of an RF burst according to an embodiment of the present invention.

FIG. 10 illustrates a second embodiment of step 804. This involves de-rotating each symbol in the training sequence with the rotation frequency of the first modulation format, e.g., GMSK as shown in step 1002. A first channel estimate is produced in step 1004 based upon the de-rotated training sequence assuming a first modulation format, e.g., GMSK. The first channel estimate is then applied to a reference training sequence of the first modulation format to produce a first reconstructed training sequence at step 1006. The first reconstructed training sequence is compared to the de-rotated training sequence to determine an error magnitude associated with the RF Burst in step 1008. The error magnitude may be accumulated with the error magnitudes of prior bursts of the same data block with the first modulation format assumption to produce a first accumulated error magnitude in step 1010. Next, each symbol is de-rotated each symbol in the training sequence with the rotation frequency of a second modulation format, e.g., 8PSK as shown in step 1012. A second channel estimate is then produced based upon the received training sequence assuming the second modulation format, e.g., 8PSK, at step 1014. The second channel estimate is then applied to the second modulation format's reference training sequence to produce a second reconstructed training sequence at step 1016. The second reconstructed training sequence is compared to the de-rotated training sequence to determine an error magnitude associated with the RF Burst in step 1018. The error magnitude may be accumulated with the error magnitudes of prior bursts of the same data block with the second modulation format assumption to produce a second accumulated error magnitude in step 1020.

In step 1022, the first accumulated error magnitude is compared to the second accumulated error magnitude. The modulation format corresponding to the lesser-accumulated error magnitude corresponds to the identified modulation format of the RF burst(s). The identified modulation format is then used further in the steps of FIG. 8 following step 804. At the first RF burst of the data block, the two error magnitude accumulation registers are reset as 0.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to identify a modulation format of a data frame received from a servicing base station by a wireless terminal in a cellular wireless communication system, the method comprises:

receiving a first Radio Frequency (RF) burst of the data frame from the servicing base station, wherein the first RF burst carries a plurality of modulated symbols and a burst index;

when the burst index of the first RF burst comes within a predetermined index value, extracting a training sequence from the first RF burst, wherein the training sequence includes modulated symbols;

processing the training sequence assuming a first modulation format to produce a first channel energy;

processing the training sequence assuming a second modulation format to produce a second channel energy;

determining a greater channel energy from the first channel energy and the second channel energy;

receiving a subsequent RF burst within the data frame from the servicing base station, wherein the subsequent RF burst carries a plurality of modulated symbols and a subsequent burst index;

when the subsequent burst index comes within the predetermined index value, processing the training sequence assuming the first modulation format to produce a subsequent first channel energy;

accumulating the subsequent first channel energy with the first channel energy to produce an accumulated first channel energy;

processing the training sequence assuming the second modulation format to produce a subsequent second channel energy;

accumulating the subsequent second channel energy with the second channel energy to produce an accumulated second channel energy;

determining a greater accumulated channel energy from the first accumulated channel energy and the second accumulated channel energy; and identifying the modulation format of the data frame as corresponding to the greater accumulated channel energy.

2. The method of claim 1, wherein:

processing the training sequence(s) assuming the first modulation format to produce the first channel energy further includes derotating the symbols within the training sequence; and processing the training sequence(s) assuming the second modulation format to produce the second channel energy further includes derotating the symbols within the training sequence.

3. The method of claim 2, wherein:

the first modulation format is GMSK; and the second modulation format is 8PSK.

4. The method of claim 1, wherein extracting the training sequence further comprises:

processing the first RF burst to produce a baseband signal; and extracting the training sequence from the baseband signal.

5. The method of claim 1, further comprising:

receiving a further subsequent RF burst within the data frame from the servicing base station, wherein the further subsequent RF burst carries a plurality of modulated symbols;

identifying a modulation format of the further subsequent RF burst based on accumulated channel energies;

comparing the identified modulation format of the further subsequent RF burst to the identified modulation format of previous RF bursts of the data frame;

demodulating the further subsequent RF burst according to the identified modulation format of further subsequent RF burst; and discarding the prior RF bursts of the data frame when the identified modulation format of the further subsequent RF burst compares unfavorably to the identified modulation format of prior RF bursts.

* * * * *